US008494814B2

(12) United States Patent
Azernikov

(10) Patent No.: US 8,494,814 B2
(45) Date of Patent: Jul. 23, 2013

(54) METHODS FOR INLET AND OUTLET MODELLING OF VENT AS LARGE AS POSSIBLE FOR HEARING AID DEVICES

(75) Inventor: Sergei Azernikov, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 297 days.

(21) Appl. No.: 12/903,269

(22) Filed: Oct. 13, 2010

(65) Prior Publication Data

US 2011/0103630 A1 May 5, 2011

Related U.S. Application Data

(60) Provisional application No. 61/257,095, filed on Nov. 2, 2009.

(51) Int. Cl.
*G06F 17/50* (2006.01)

(52) U.S. Cl.
USPC .......... 703/1

(58) Field of Classification Search
USPC .......... 703/1
See application file for complete search history.

(56) References Cited

U.S. PATENT DOCUMENTS

| | | | | |
|---|---|---|---|---|
| 5,487,012 | A * | 1/1996 | Topholm et al. | 700/163 |
| 5,875,254 | A | 2/1999 | Hanright | |
| 6,167,138 | A * | 12/2000 | Shennib | 381/60 |
| 7,050,876 | B1 * | 5/2006 | Fu et al. | 700/118 |
| 7,328,080 | B2 * | 2/2008 | Fu et al. | 700/118 |
| 2002/0136420 | A1 * | 9/2002 | Topholm | 381/312 |
| 2002/0158880 | A1 * | 10/2002 | Williams et al. | 345/582 |
| 2002/0196954 | A1 * | 12/2002 | Marxen et al. | 381/312 |
| 2003/0074174 | A1 * | 4/2003 | Fu et al. | 703/13 |
| 2005/0169492 | A1 * | 8/2005 | Topholm | 381/322 |
| 2007/0009129 | A1 * | 1/2007 | Meyer et al. | 381/328 |
| 2007/0189564 | A1 * | 8/2007 | McBagonluri et al. | 381/322 |
| 2007/0223757 | A1 | 9/2007 | Saltykov et al. | |

FOREIGN PATENT DOCUMENTS

| | | |
|---|---|---|
| EP | 2048895 | 4/2008 |
| EP | 2023662 | 11/2009 |
| WO | WO0230157 | 4/2002 |
| WO | WO02071946 | 9/2002 |

* cited by examiner

*Primary Examiner* — Dwin M Craig
(74) *Attorney, Agent, or Firm* — Donald B. Paschburg; F. Chau & Associates, LLC

(57) ABSTRACT

A method of modeling an opening of a hearing aid vent includes defining a trimming surface through a tip of the vent as one of a planar surface or a non-planar surface, and trimming the shell along the trimming surface to the expose the interior of the shell to create the vent opening. The tip includes an endpoint of the vent and the hearing aid shell fits inside an ear of a patient.

15 Claims, 11 Drawing Sheets a) non-planar trimming surface b) non-planar VALAP with receiver hole (a) D-shaped vent on the tip plane (b) D-shape vent on IROS cut (c) collection vent on 45deg cut a) non-planar trimming surface b) non-planar VALAP with receiver hole

METHODS FOR INLET AND OUTLET MODELLING OF VENT AS LARGE AS POSSIBLE FOR HEARING AID DEVICES

CROSS-REFERENCE TO RELATED APPLICATIONS

This application claims priority to U.S. Provisional Application No. 61/257,095, filed on Nov. 2, 2009, the disclosure of which is incorporated by reference herein.

BACKGROUND OF THE INVENTION

1. Technical Field

The present disclosure relates generally to hearing aid devices, and more particularly, to modeling of inlets and outlets of hearing aid vents within hearing aid devices.

2. Discussion of Related Art

A hearing aid device (HAD) is an electro-acoustic device, which may be worn within the wearer's ear, and is designed to amplify and modulate sound for the wearer. There is a growing requirement for miniaturization of HADs. However, it can be a challenging task to manufacture such devices. Manufacturing technologies and computer aided drawing/manufacturing (CAD/CAM) tools are used to aid in the miniaturization of HADs. A contemporary HAD design process starts by capturing three dimensional (3D) information from an impression taken from a patient's ear. Then, the captured data is converted into a polygonal surface, which is used as a basis for a personalized device design. When the design is completed, the HAD is manufactured directly from the resulting polygonal model by layered manufacturing (LM).

The resulting HAD should fit precisely into a patient's ear. However, since the fit is so precise, the ear is hermetically sealed, thereby causing pressure differences and an occlusion effect inside the ear canal. A vent may be created through the entire shell of the hearing aid device creating an inlet on one surface of the shell and an outlet on a second surface of the shell. The vent allows for air to pass from the ear canal through the inlet and the outlet to the outside to reduce occlusion.

Since, increasing the volume of the vent may allow for reductions in the occlusion, and the shape and size of inlet and outlet openings contribute to vent volume, there is a need for improved methods for modeling inlets and outlets of hearing aid shells to increase the volume of the vent.

SUMMARY OF THE INVENTION

According to an exemplary embodiment of the invention, a method of modeling an opening of a hearing aid vent includes defining a trimming surface through a tip of the vent as one of a planar surface or a non-planar surface, and trimming the shell along the trimming surface to the expose the interior of the shell to create the vent opening. The tip includes an endpoint of the vent and the hearing aid shell fits inside an ear of a patient. The trimming may be performed after modeling of the shell to generate an inner wall of the shell and place components in the shell for providing acoustic signals to the ear.

According to an exemplary embodiment of the invention, a hearing aid includes a hearing aid shell. The hearing aid shell includes a microphone to sense sound from air for conversion into electrical signals, a receiver to convert the signals into acoustic signals, and a battery. The shell is configured to fit within an ear of a patient. The shell includes a ventilation tube through the entire shell with an inlet on a tip plane of the shell configured to fit within an ear canal of the patent and an outlet on a face plate plane of the shell. The inlet has one of a planar surface or a non-planar surface. The outlet has one of a planar surface or a non-planar surface. The planar surface may include a first flat cut through an inner wall and outer wall of the shell on one side of the shell and a second flat cut through the inner wall and outer wall on an opposing side of the shell. The first and second flat cuts line up with one another. The non-planar surface may be a concave surface.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF EXEMPLARY EMBODIMENTS

In general, exemplary embodiments of systems and methods for modeling an opening of a hearing aid vent is discussed in further detail with reference to FIGS. 1-11. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
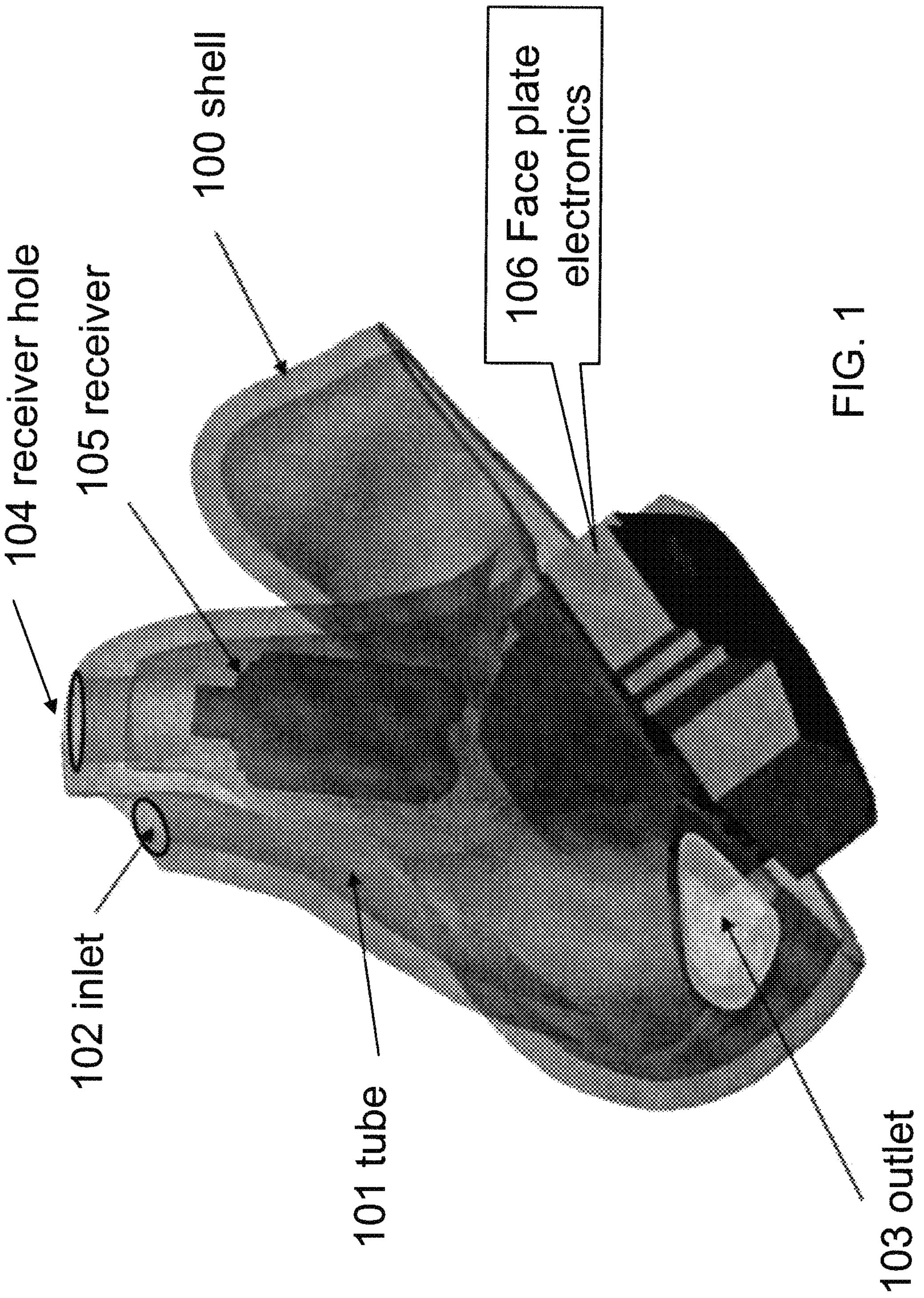
FIG. 1 illustrates an example of a hearing aid with a vent optimized according to an exemplary embodiment of the invention.

Embodiments of the invention attempt to generate a vent in a hearing aid shell of a hearing aid with the highest volume possible given the layout of the electronic components within the shell. FIG. 1 illustrates an example of a hearing aid having a shell 100, where the shell 100 fits within the inner ear, includes a vent, and includes components to provide acoustic signals. The vent is comprised of a ventilation tube 101, an inlet 102, and an outlet 103.

The components may include faceplate electronics 106 including a microphone to pick up sound from the air for conversion into electrical signals, a battery, and a receiver 105 (e.g., a speaker) to convert the electrical signals into the acoustic signals heard by the user. The faceplate electronics may further include at least one of an amplifier to increase intensity of the signals from the microphone, an antenna, and a small computer programmed to manipulate the signals to fit the hearing loss of the individual user computer.

The shell 100 may include a receiver hole 104 adjacent the inlet 102 for the receiver 105. The shell 100 may have been derived from three dimensional (3D) information of an impression taken from a patient's ear. The inlet 102 emanates from the tip of the shell 100 that is configured to be inserted into the ear canal of a patient.

Figure 2:
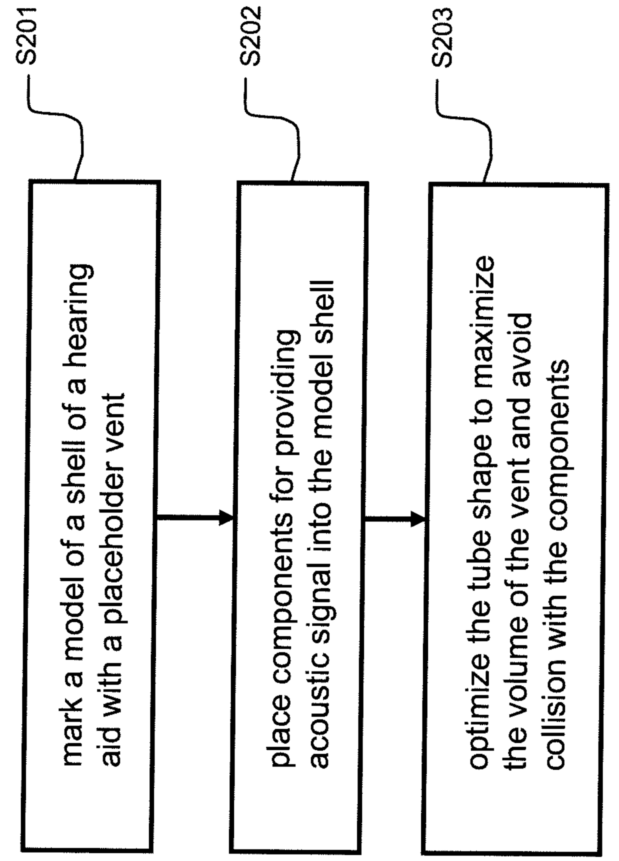
FIG. 2 illustrates a method of performing the optimization according to an exemplary embodiment of the invention.
Figure 3:
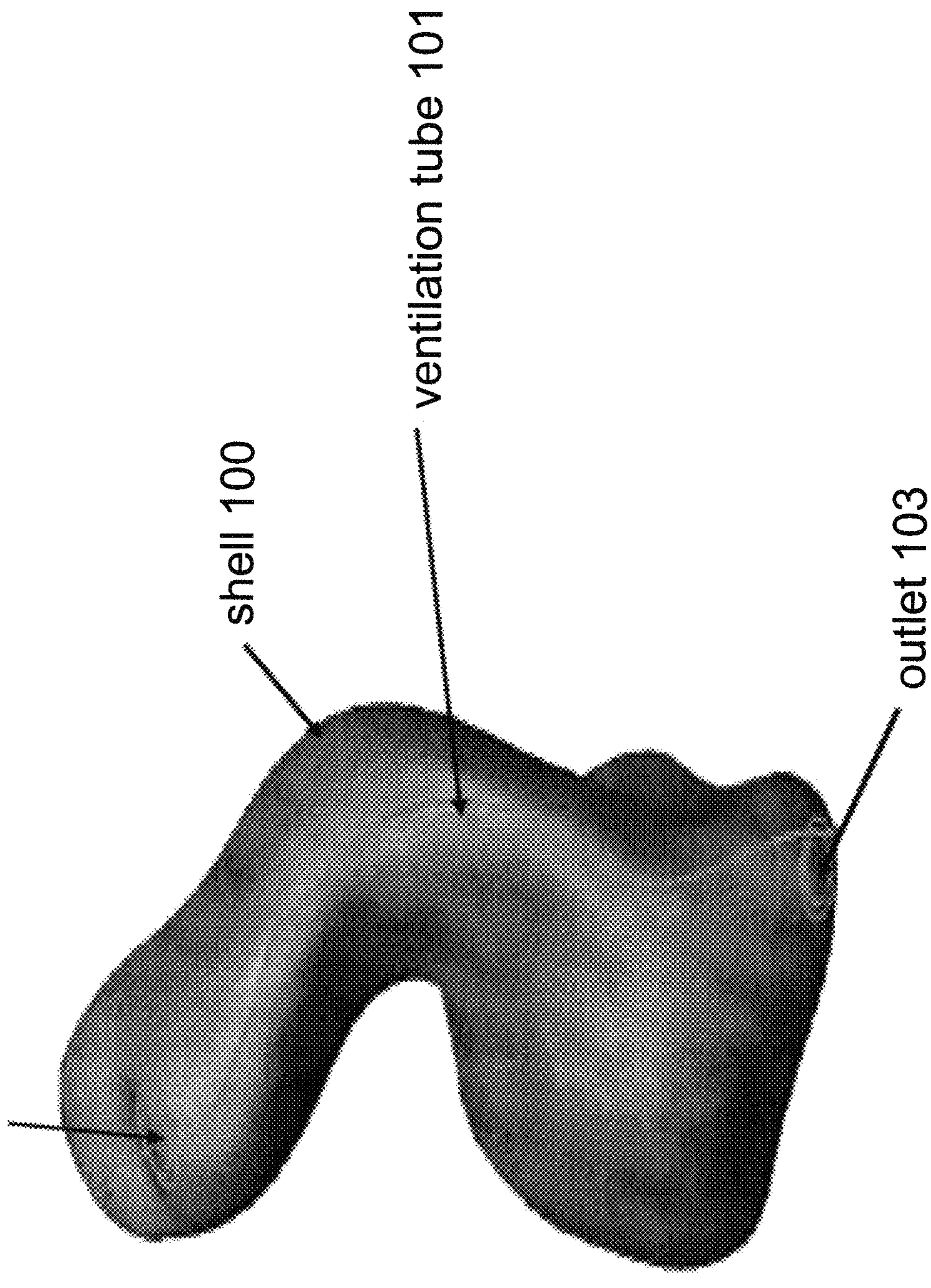
FIG. 3 illustrates placement of a vent on a modeled hearing aid shell according to an exemplary embodiment of the invention.

According to an exemplary embodiment of the invention, the shape of the ventilation tube 101 may have been created using the method of FIG. 2. Referring to FIG. 2 the method includes marking a model of a shell of a hearing aid with a placeholder vent (S201), placing components for providing acoustic signals into the model shell (S202), and optimizing a shape of the tube to maximize volume of the vent and avoid collision with the components (S203). FIG. 3 illustrates an example of marking the shell 100 with the placeholder vent as discussed above.

Figure 4:
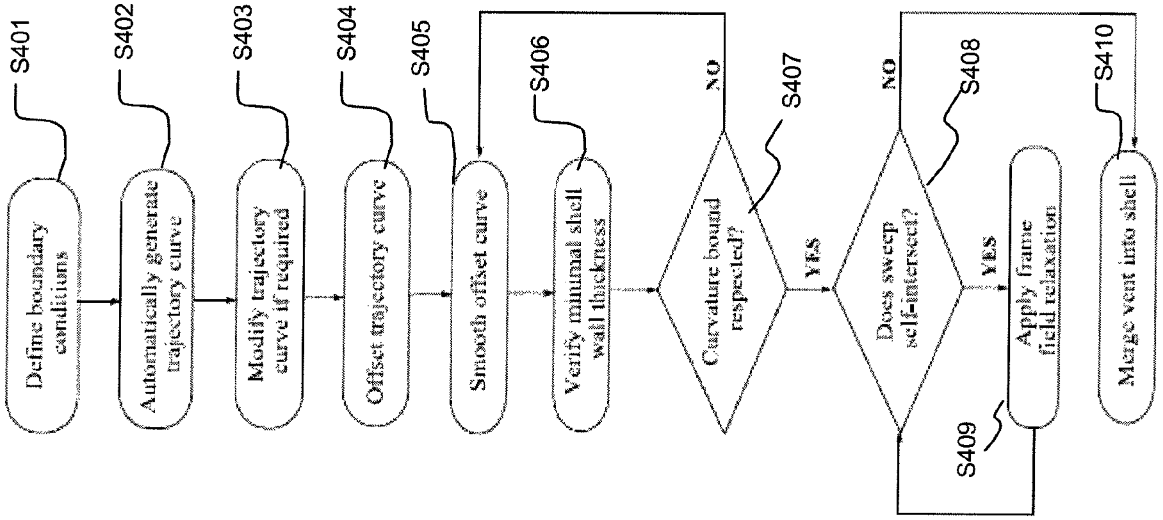
FIG. 4 illustrates a method of optimizing the shape of a tube of the vent according to an exemplary embodiment of the invention.

According to an exemplary embodiment of the invention, the optimizing of the shape of the tube 101 may be performed using the method of FIG. 4. Referring to FIG. 4, the method includes defining boundary conditions for the tube (S401), generating a trajectory curve based of the tube (S402), modifying the trajectory curve required by the boundary conditions (S403), offset the trajectory curve (S404), smooth the offset curve (S405), verify minimal shell wall thickness (S406), and determine whether curvature bounds have been respected (S407). If the curvature bounds were not respected, then the method re-performs the smoothing, verification, and curvature bound check of steps (S405-407). If the curvature bounds were respected or are now respected, the method continues by determining whether the sweep self-intersects (S408). If the sweep does not self-intersect, then the resulting vent can be merged into the shell (S410). However, if the sweep did self-intersect, a frame field relaxation is applied (S409) as necessary until the self-intersect check (S408) determines that the sweep does not self-intersect.

Figure 5:
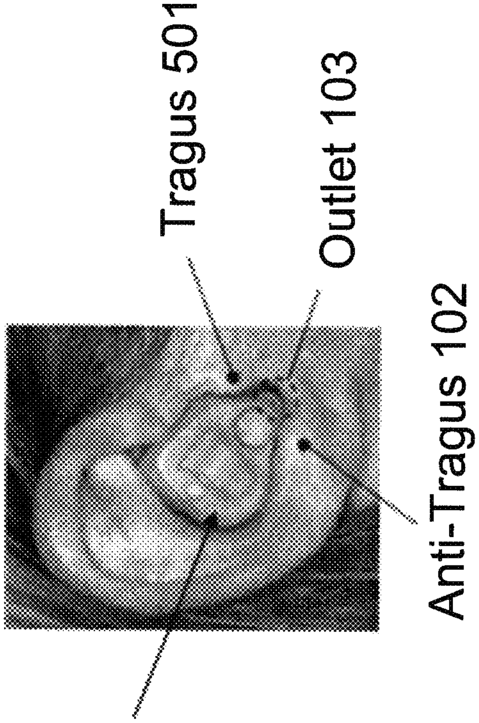
FIG. 5 illustrates an example of the location of a vent relative to features of the ear.

The trajectory curve is defined over a surface of the shell 100, which is assumed to be a piecewise smooth two-manifold. A user can define the starting and endpoint points of the curve. The curve is traced onto the surface. The ventilation tube 101 (e.g., a venting channel) can be located along the ridge of the ear canal to reduce space taken by the tube and increase contact area between the shell surface and the tube. The vent may be located along the inter-tragal notch. FIG. 5 illustrates an example of the outlet 103 emanating from a point on the shell 100 between the Tragus region 501 and the Anti-tragus region 502, which is on an opposite side of the shell 100 from the inlet 102.

The inter-tragal notch is a geometric feature on the ear canal's surface. A curvature sensitive metric on the surface can be used to guide feature tracing in a direction perpendicular to the maximal curvature. Based on that metric, the inter-tragal notch can be found as a shortest path or the geodesic curve on a two-manifold equipped with a non-Euclidean metric. The geodesic curve can be approximated by first employing the Dijkstra algorithm to compute the initial approximation of the discrete shortest path and then smoothing the resulting curve with a Laplace operator, constraining the starting and ending points. However, this may take the curve off the surface, which requires projection of the curve back to the surface. Then a cubic spline curve may be fitted to the found polygonal curve, to allow a user interactive modification of the produced trajectory. The final trajectory may be used to define an offset curve, which may not lay on the surface.

Since the ventilation tube 101 should be located inside the ear impression surface, the produced trajectory is projected inside the surface. The ventilation channel should not exceed a maximal curvature bound predefined by acoustic and maintenance requirements. The offset curve computation is initialized with the trajectory curve equally sampled and projected in opposite to the normal direction. The projection depth is dictated by the layout of components inside the hearing aid device, since the generated tube should not collide with any of the prepositioned components. The resulting points are smoothed, a cubic B-spline curve is fitted, and then the trajectory curvature is computed. Next, the point of maximal curvature is identified, and if the point of the curvature exceeds the upper bound, projected points in a certain neighborhood of the point are deleted and the curve is refitted using the remaining points. The procedure may be iteratively repeated until the curvature upper bound is respected everywhere on the trajectory curve.

To sweep a contour along the trajectory curve, a frame field is associated with the trajectory curve. Orientations of the contour at both ends are predefined by a user to approximate the minimal rotation frame field. The frame field constructed may minimize the torsion of the ventilation tube, while respecting user provided constraints. However, the produced tube may have self-intersections in the high curvature regions of the trajectory curve. The frame field may be modified to avoid self-intersections of the sweeping surface.

Figure 6:
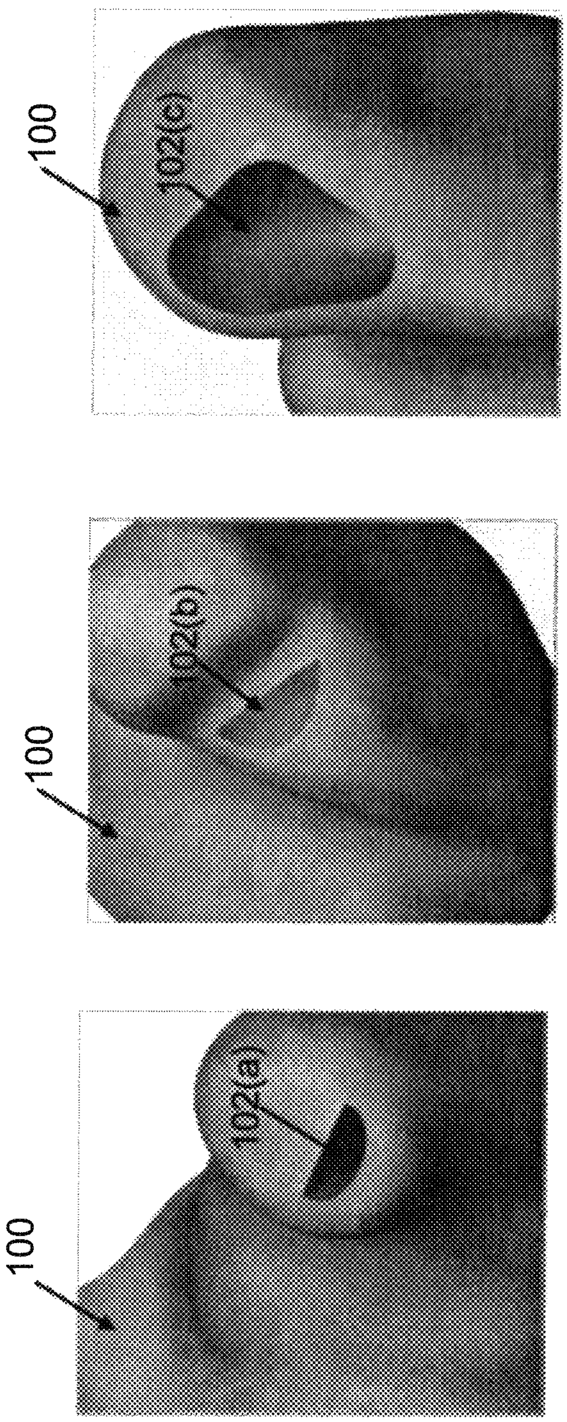
FIGS. 6(*a*), 6(*b*), and 6(*c*) illustrate examples of different inlets of hearing aid shells.

The above optimization of the ventilation tube may significantly increase the volume of the vent to help reduce acoustic feedback. The inlet 102 and outlet 103 may also be shaped to further increase this volume. FIG. 6(*a*) illustrates a D-shaped inlet 102(*a*) on a tip of the shell 100, FIG. 6(*b*) illustrates a D-shaped inlet 102(*b*) on an IROS cut, and FIG. 6(*c*) illustrates inlet 102(*c*), where the tip is cut at a 45 degree angle to create a collection vent. The IROS cut is a corner cut, which is defined by two perpendicular planes.

However, in techniques that generate the vents shown in FIG. 6, the vent size is a defined a priori during the shell detailing process, and if the vent size needs to be changed, the shell shape must be modified. For example, the IROS cut and the 45 degree cut for the collection vent are applied on the shell during the detailing but before generation of the inner wall of the shell and placement of the components within the shell. However, the size of a vent as large as possible for maximizing vent volume (VALAP) is unknown until of the components of the hearing aid are placed within the hearing aid shell. Therefore, interdependency of the vent size and shell detailing makes the design process very cumbersome and time consuming.

In at least embodiment of the present invention, shell shape modification and inlet generation are combined into one single operation, which makes vent inlet modeling simpler and more robust. Further, operator time is saved since iterative shell shape modification to create maximal vent inlets/outlets may be eliminated. The combined operation is applied by defining a planar or non-planar trimming surface and trimming the shell with this surface to create the inlet 102 and/or the outlet 103, which may generate a large vent (e.g., referred to as a VALAP). For the VALAP, the cut is performed after inner wall generation and component placement, in the modeling of the hearing aid shell, which may eliminate the need to iteratively modify component positioning after vent generation.

Figure 7:
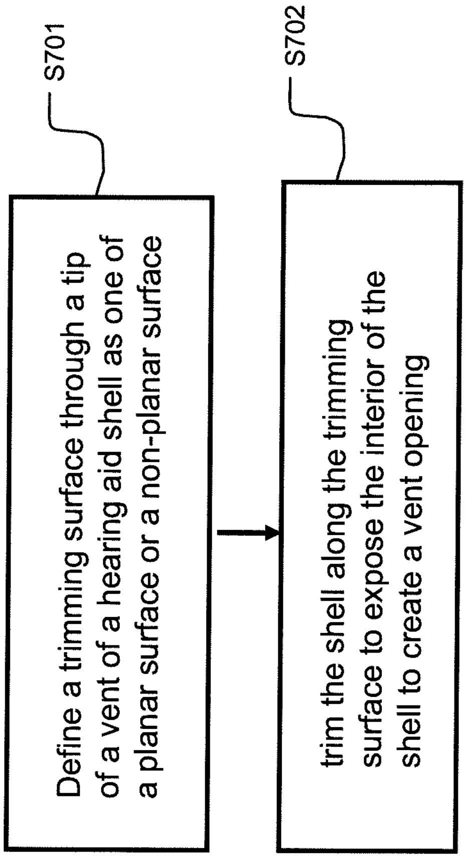
FIG. 7 illustrates a method of modeling an opening of a vent according to an exemplary embodiment of the invention.

FIG. 7 illustrates a method of modeling an opening of a hearing aid vent according to an exemplary embodiment of the invention. Referring to FIG. 7, the method includes defining a trimming surface through a tip of the vent to be one of a planar surface or a non-planar surface (S701), and trimming the shell along the trimming surface to the expose the interior of the shell to create the vent opening (S702). The tip includes an endpoint of the vent and the hearing aid shell fits inside an ear of a patient. The trimming may be performed after modeling of an inner wall of the shell of the hearing aid and placement of components within the shell for providing the acoustic signals to the ear.

Figure 8:
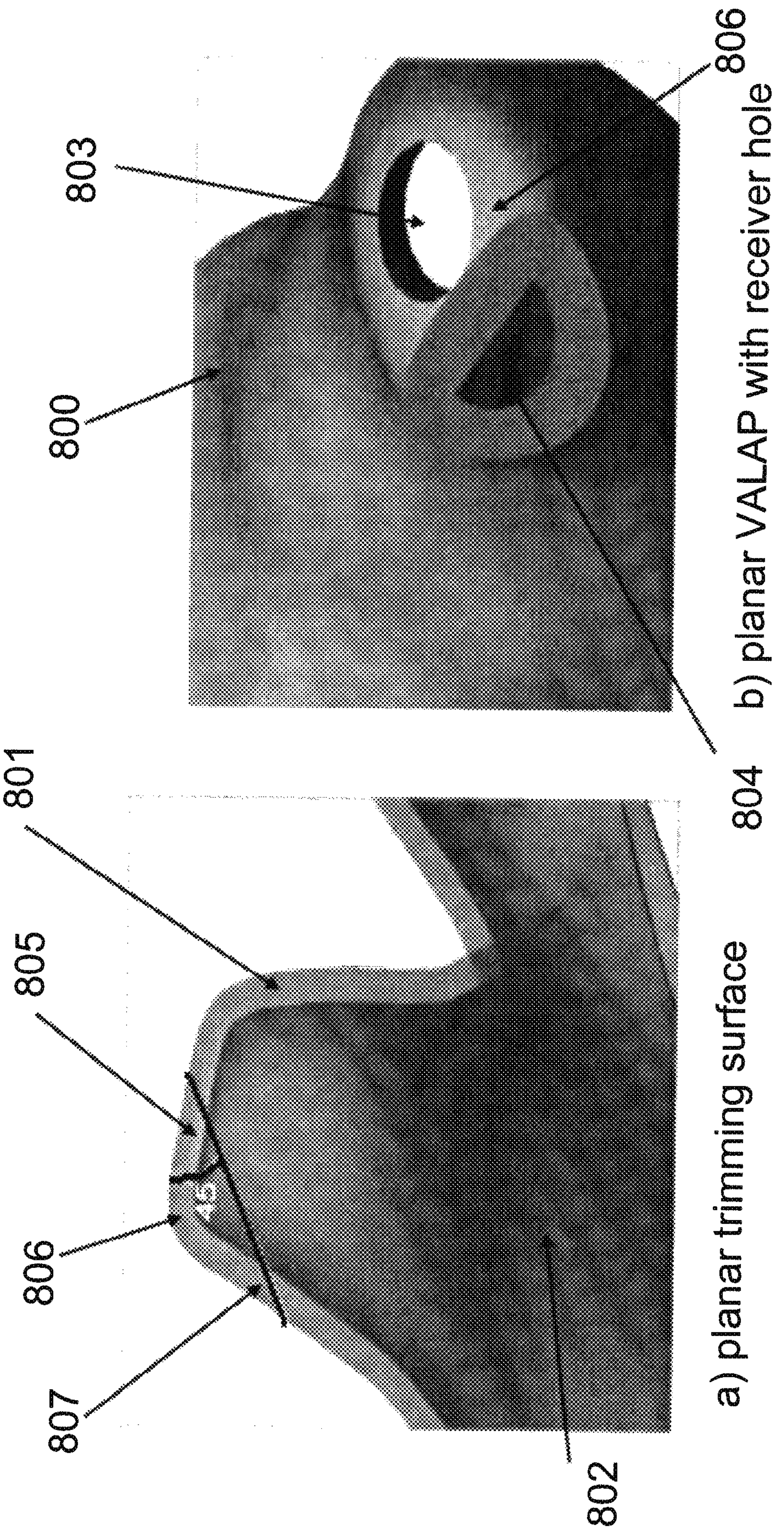
FIG. 8(*a*) and FIG. 8(*b*) illustrate the creation of an inlet of a vent of a hearing aid shell according to an exemplary embodiment of the invention.
Figure 9:
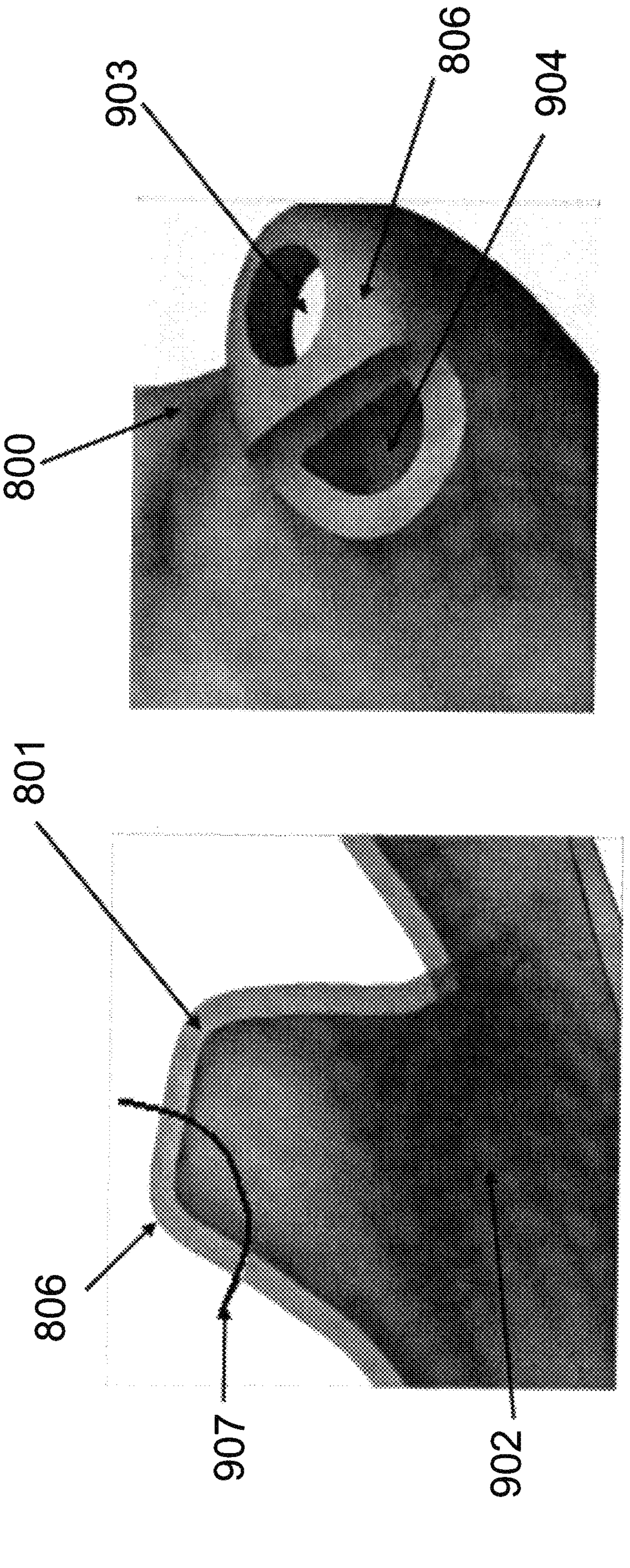
FIG. 9(*a*) and FIG. 9(*b*) illustrate the creation of an inlet of a vent according to another exemplary embodiment of the invention.
Figure 10:
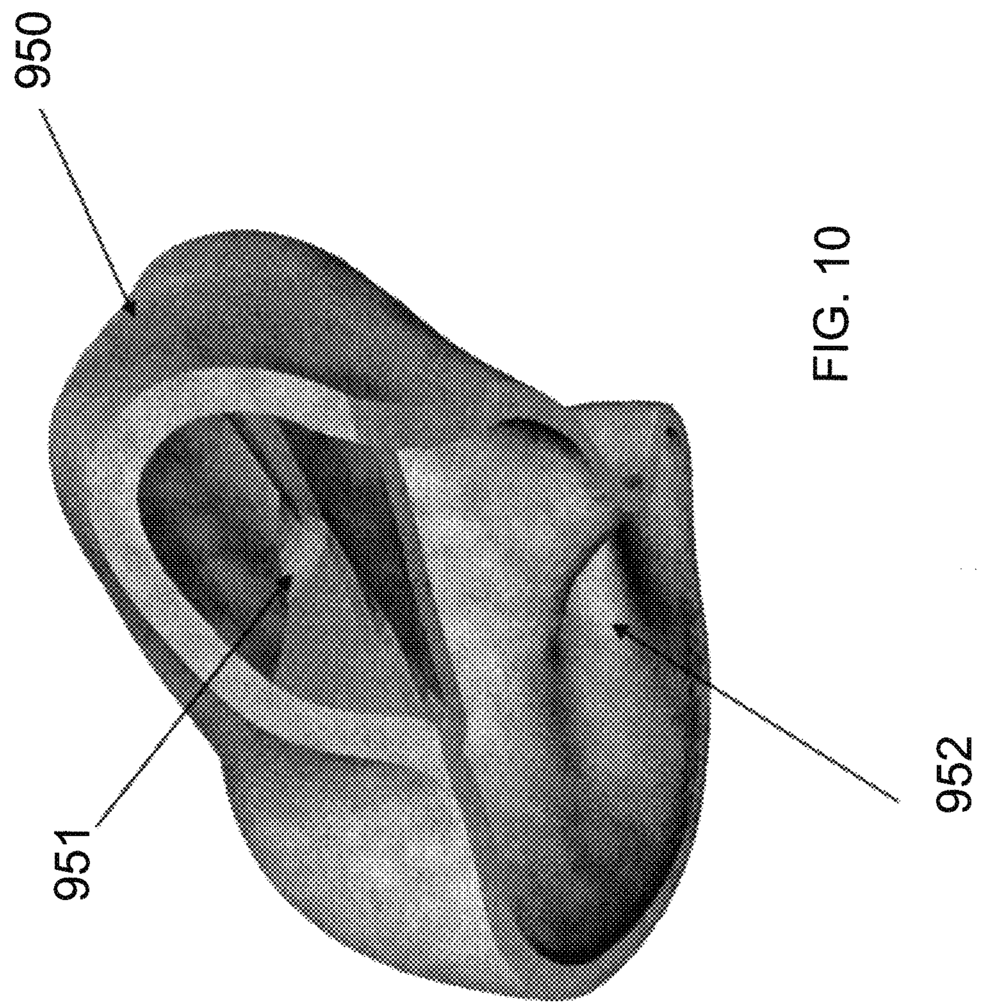
FIG. 10 illustrates an example of an outlet of a vent that may be created according an exemplary embodiment of the invention.

As shown by FIG. 8, FIG. 9, and FIG. 10, the trimming may be used to create an inlet for a tube of the vent on the tip when the tip is configured to be inserted into an ear canal of the ear or used to create an outlet for the tube of the vent when the tip is located near the face plate of the hearing aid shell (e.g., when the tip is adjacent the faceplate opening).

Referring to FIG. 8(*a*) and FIG. 8(*b*), the planar surface 807 may have a rotational angle 805 that differs from a plane of the tip 806 (i.e., the tip plane). The tip plane, which is perpendicular to a normal of the tip 806, may be rotated at the selected angle 805 to form the planar surface 807. The trimming of the shell 800 using the planar surface 807 to generate the inlet 804 may include cutting the outer wall and inner wall of the shell 800 through to the interior 802 at the angle.

While FIG. 8(*a*) shows the angle 805 as 45 degrees, in other embodiments, the angle 805 ranges between about 30 degrees and about 60 degrees. As shown by FIG. 8(*b*), in at least one embodiment of the invention, the angle 805 is chosen such that the trimming surface 807 intersects with or comes close to intersecting an edge of a receiver hole 803 of the shell 800. The cut is close to the receiver hole 803 to maximize the area of the inlet 804. The angle of the planar trimming surface 807 is limited by the location of the receiver hole 803. For example, had a larger angle been chosen for the planar trimming surface 807, the cut may have interfered with the receiver hole 803 or affected the integrity of the shell 800 around the receiver hole 803.

The planar trimming surface 807 may be described as including a first flat cut through the inner wall and the outer wall of the shell on one side of the shell 800 and a second flat cut through the inner wall and outer wall on an opposing side of the shell 800, where the first and second flat cuts line up with one another, and an edge of one of the cuts is adjacent an edge of the receiver hole 803.

The inlet 804 may be D-shaped. The inlet 804, however, may not be suitable when the shell 800 has a small tip area for insertion into a narrow ear canal.

As shown by FIG. 10, in at least one embodiment of the invention, the angle is chosen such that the trimming surface intersects with or comes close to intersecting with an edge of a faceplate hole 925 of the shell 950 to form an output 951. The faceplate hole 952 may be on a side of the shell 950 opposite the receiver hole 803. The components of the hearing aid are placed into the shell 950 through the faceplate hole 952 and the faceplate may be placed over the faceplate hole to protect the components from liquids.

In another embodiment of the invention, which may be more suitable for shells with small tip areas, the cut is applied directly on both the outer shell wall and the inner shell wall using a non-planar trimming surface, as shown in FIG. 9(*a*) and FIG. 9(*b*). The non-planar cut may be performed with a ruled surface, which is perpendicular to a plane of the tip 806 (i.e., the shell tip plane) on one end of the shell wall and the shell wall on the other. The inlet 904 generated with the non-planar cut may be more efficient than inlet 804, since it has a bigger opening and occupies less space, and may be more desirable for patients with narrow ear canals, for which space on the tip of the hearing aid shell is very limited.

As shown by FIG. 9(*a*) and FIG. 9(*b*), the non-planar surface may be a concave geodesic curve 907 relative to the tip 806. For example, a surface of the tip 806 may be convex and the non-planar surface 907 may be opposite in curvature. The trimming using the non-planar surface to create the inlet 904 may be performed by cutting through an outer wall and an inner wall of the shell 800 through to the interior 802 at an angle perpendicular to the tip plane at a first distance left of the tip 806, and cutting through the outer wall and inner wall through to the interior 802 at an angle perpendicular to the tip plane at a second distance right of the tip 806. The inlet 904 may have a curved D-shape.

In at least one embodiment, the first distance and the second distance are substantially equal to one another. When the inlet 904 is adjacent the receiver hole 803, at least one of the distances may be chosen to ensure that a thickness of the shell on a right side of the receiver hole 803 is substantially the same as the thickness of the shell on a left side of the receiver hole 803.

When the outlet 951 is adjacent the face plate hole 952, at least one of the distances may be chosen to ensure that a thickness of the shell 950 on a right side of the faceplate hole is substantially the same as the thickness of the shell on a left side of the faceplate hole.

Figure 11:
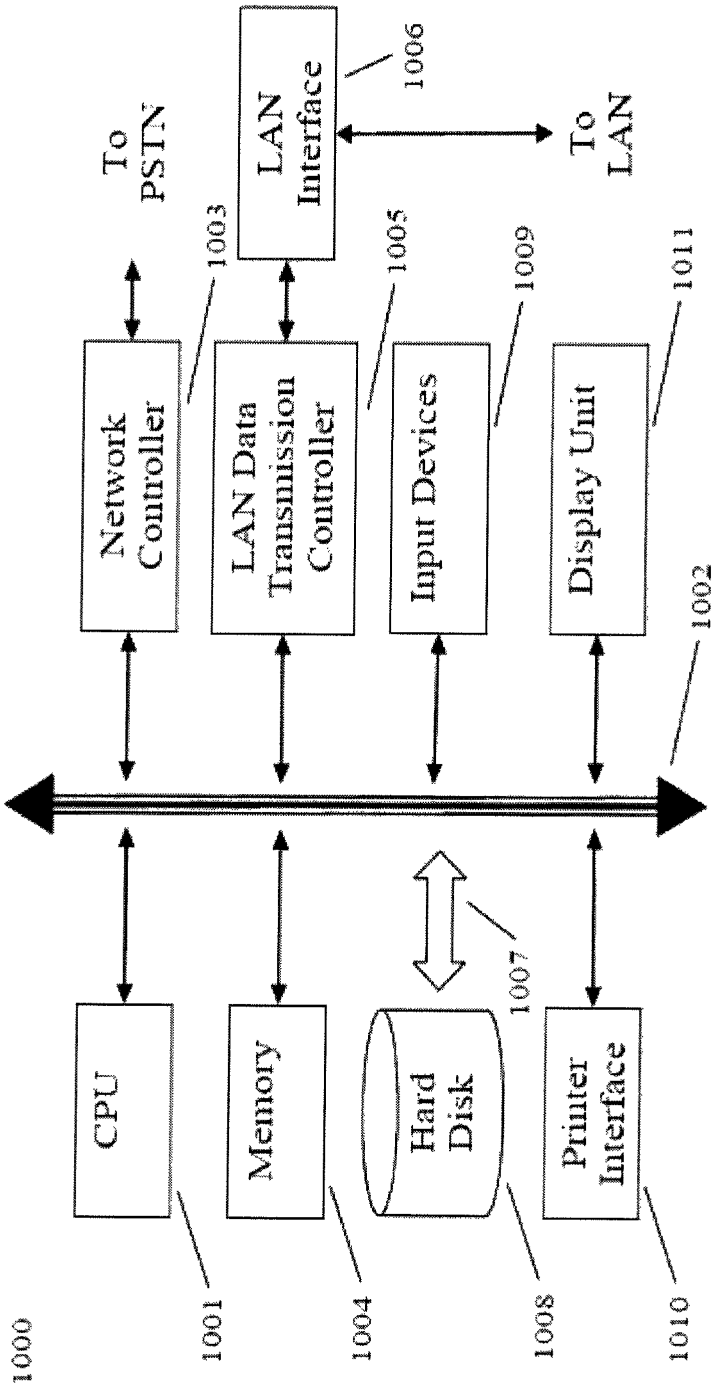
FIG. 11 illustrates an example of a computer system capable of implementing methods and systems according to embodiments of the present invention.

FIG. 11 shows an example of a computer system, which may implement a method and system of the present disclosure. The system and methods of the present disclosure, or part of the system and methods, may be implemented in the form of a software application running on a computer system, for example, a mainframe, personal computer (PC), handheld computer, server, etc. For example, the method of FIG. 2, FIG. 4, and FIG. 7 may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1-11.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of modeling a vent opening of a hearing aid vent, the method comprising:
  - defining a trimming surface through a tip of the hearing aid vent as a non-planar surface; and
  - trimming a shell of the hearing aid along the trimming surface to expose the interior of the shell to create the vent opening, wherein the tip includes an endpoint of the vent,
  - wherein the shell fits inside an ear and the method is performed by a processor.

2. The method of claim 1, wherein the trimming is performed after modeling of the shell to generate an inner wall of the shell and components in the shell are placed in the shell for providing acoustic signals to the ear.

3. The method of claim 1, wherein the non-planar surface is a concave geodesic curve relative to the tip.

4. The method of claim 1, wherein the trimming creates an inlet for a tube of the vent on the tip when the tip is configured to be inserted into an ear canal of the ear, and wherein the trimming creates an outlet for the tube when the tip is adjacent a face plate hole of the hearing aid shell.

5. The method of claim 1, wherein the trimming comprises:
  - cutting through an outer wall and an inner wall of the shell at an angle perpendicular to the tip plane at a first distance left of the tip; and
  - cutting through the outer wall and inner wall at an angle perpendicular to the tip plane at a second distance right of the tip.

6. The method of claim 5, wherein the first distance and the second distance are substantially equal to one another.

7. The method of claim 6, wherein the vent opening is adjacent a receiver hole in the shell, and one of the distances is chosen to ensure that a thickness of the shell on a right side of the receiver hole is substantially the same as the thickness of the shell on a left side of the receiver hole, wherein the receiver hole is configured for a receiver, and the receiver is one of the components.

8. The method of claim 6, wherein the vent opening is adjacent a face plate hole of the shell, and one of the distances is chosen to ensure that a thickness of the shell on a right side of the faceplate hole is substantially the same as the thickness of the shell on a left side of the faceplate hole, wherein the faceplate hole is configured to receive a faceplate of the hearing aid shell.

9. A non-transitory computer readable storage medium embodying instructions executable by a processor to perform method steps for modeling a vent opening of a hearing aid vent of a hearing aid, the method steps comprising instructions for:
  - defining a trimming surface through a tip of the hearing aid vent as a non-planar surface; and
  - trimming a shell of the hearing aid along the trimming surface to expose the interior of the shell to create the vent opening, wherein the tip includes an endpoint of the vent,
  - wherein the shell fits inside an ear of a patient.

10. The non-transitory computer readable storage medium of claim 9, wherein the trimming is performed after modeling of the shell to generate an inner wall of the shell and components are placed in the shell for providing acoustic signals to the ear.

11. The non-transitory computer readable storage medium of claim 9 wherein the trimming comprises:
  - cutting through an outer wall and an inner wall of the shell at an angle perpendicular to the tip plane at a first distance left of the tip; and
  - cutting through the outer wall and inner wall at an angle perpendicular to the tip plane at a second distance right of the tip.

12. The non-transitory computer readable storage medium of claim 11, wherein the first distance and the second distance are substantially equal to one another.

13. A method of modeling a vent opening of a hearing aid vent of a hearing aid, the method comprising:
  - defining a trimming surface through a tip of the vent as a planar surface; and
  - trimming a shell of the hearing aid along the trimming surface to expose the interior of the shell to create the vent opening, wherein the tip includes an endpoint of the vent,
  - wherein the shell fits inside an ear,
  - wherein the planar surface has a rotational angle that differs from a plane of the tip,
  - wherein the angle is chosen such that the trimming surface intersects with an edge of a receiver hole of the shell, wherein the receiver hole is configured for a receiver.

14. The method of claim 13, wherein the trimming surface is adjacent to the receiver hole without surrounding the receiver hole.

15. A method of modeling an opening of a hearing aid vent of a hearing aid, the method comprising:
  - defining a trimming surface through a tip of the vent as a planar surface; and
  - trimming a shell of the hearing aid along the trimming surface to expose the interior of the shell to create the vent opening, wherein the tip includes an endpoint of the vent,
  - wherein the shell fits inside an ear,
  - wherein the planar surface has a rotational angle that differs from a plane of the tip,
  - wherein the angle is chosen such that the trimming surface intersects with an edge of a faceplate hole of the shell,
  - wherein the faceplate hole is configured to receive a faceplate of the shell.

* * * * *